Nov. 1, 1955          H. J. AROYAN          2,722,548

OXIDATION OF XYLENES

Filed Dec. 17, 1952

RUNS AT 600°F.
MOL RATIO XYLENE: SULFUR: AMMONIA = 1:6:2.5

YIELD OF PHTHALIC ACIDS AT COMPLETE XYLENE CONVERSION,
A — 93.1 MOL %
B — 91.8 MOL %
C — 69.5 MOL %

FEED MOL RATIO = WATER TO XYLENE
A — 100 TO 1
B — 25 TO 1
C — 10 TO 1

INVENTOR
*HARRY J. AROYAN*

BY *A. L. Snow.*
*Frank E. Johnston*
ATTORNEYS

United States Patent Office
2,722,548
Patented Nov. 1, 1955

2,722,548

OXIDATION OF XYLENES

Harry J. Aroyan, El Cerrito, Calif., assignor to California Research Corporation, San Francisco, Calif., a corporation of Delaware Application December 17, 1952, Serial No. 326,433

3 Claims. (Cl. 260—524)

This invention relates to an improved process for oxidizing xylenes to produce phthalic acid derivatives or phthalic acids.

The Willgerodt reaction has been known for more than fifty years. The reaction has been applied to effect the oxidation of ketones, aldehydes and unsaturated hydrocarbons to acid amides. The reaction is characterized by a slow rate which results in long reaction times and low yields of amide, usually less than 60% of theoretical. The literature indicates that the Willgerodt reaction has been extensively explored and has received a great deal of time and consideration by skilled workers in the art. So far as is known, there has never been a commercial application of the Willgerodt reaction. The poor yields and long reaction times which are characteristic of the reaction appear to constitute an economic block to commercial adaptations of the reaction.

U. S. Patent No. 2,610,980 describes the extension of the Willgerodt reaction to the oxidation of alkyl benzenes and exemplifies the oxidation of toluene, ethyl benzene, cumene and para-xylene. The reaction times and yields obtained during the oxidation of these materials pretty much parallel those reported in the literature in connection with the oxidation of other materials by the Willgerodt reaction, being long and low, respectively.

It is an object of this invention to provide an improved method for oxidizing xylenes by the Willgerodt reaction to obtain high yields of phthalic acids or phthalic acid derivatives in short reaction times.

Pursuant to the invention, the oxidation of xylenes by heating them with water, sulfur and ammonia to an elevated temperature under a superatmospheric pressure is accomplished in short reaction periods and at high conversions and yields by maintaining the mole ratio of water to xylene in the reaction zone above about 25:1 and in the range of about 25:1 to about 100:1. The beneficial effects of the high mole ratio of water to xylene is fully realized only when the temperature in the reaction zone is maintained above 580° F. and below the critical temperature of water, preferably in the range from 600 to 675° F., and when the pressure in the reaction zone is maintained above 1700 p. s. i. g. and at least 400 p. s. i. above the pressure of steam in equilibrium with liquid water at reaction temperature, and preferably in the range from 2500 p. s. i. g. to 6000 p. s. i. g.

A series of runs were made in which xylene, water, sulfur and ammonia were charged to a stainless steel bomb equipped with a pressure gauge and a thermowell. For each mole of xylene charged to the reactor in the several runs, 6 gram atoms of sulfur and 2.5 moles of ammonia were charged. The quantity of water charged was varied. After charging, the bomb was sealed and placed in a shaking mechanism attached with a heater so that the contents of the bomb could be agitated at reaction temperature. In the runs the reaction temperature employed was 600° F. and the bomb and contents were very rapidly heated to this temperature so that essentially all of the reaction occurring took place at 600° F. The xylene feed in these runs was 96% meta-xylene, the remainder of the hydrocarbon charge being mainly para-xylene, ethyl benzene and non-aromatic hydrocarbons. The reaction product in the runs was worked up by stripping with steam until the pH reached a value of 6 to 7. During steam stripping, ammonia and unreacted xylene were removed from the reaction product, and elemental sulfur was precipitated. The steam stripped reaction product was filtered to remove sulfur and the filtrate was saponified by adding caustic and steam stripped to remove ammonia, which was released. After saponification and stripping, the filtrate was acidified to a pH of 6 to 7 and treated with activated charcoal to remove color bodies. The filtrate from the carbon treatment was acidified to a pH 2 with concentrated hydrochloric acid during which operation the phthalic acids were precipitated from the solution. The phthalic acids were filtered from the solution, washed with water, and dried. The dissolved product in the latter filtrate was recovered by concentrating, chilling, and filtering. The products were then analyzed for purity by determining neutralization and saponification equivalents. A number of runs was made employing different mole ratios of water to xylene in the charge to the reaction vessel. In these runs the quantity of reactants charged to the reaction vessel irrespective of the water-xylene mole ratio was a quantity such that 0.28 mole of xylene was present for each liter of reactor space.

The results of these runs are shown in the appended drawing which graphically illustrates the effect of varying mole ratios of xylene to water on reaction rate and phthalic acid yield.

It will be noted that when the mole ratio of water to xylene employed is 25:1, the reaction was 80% completed in 30 minutes and that the yield of phthalic acids based on xylenes converted is 91.8 mole per cent. Raising the mole ratio of water to xylene from 25:1 to 100:1 results in further shortening the reaction period and further improvement of the yield based on xylene converted. When the mole ratio of water to xylene was 10:1 only 70% of the xylene was converted in 100 minutes, and yield based on conversion was only 69.5 mole per cent.

In parallel runs with 95% para-xylene it was established that reaction times and conversions were shortened and increased, respectively, by increasing the mole ratio of water to xylene, just as in the case of meta-xylene, and that yields based on conversion were slightly higher. In parallel runs with ortho-xylene, increasing mole ratios of water to xylene again increased conversions and shortened reaction times, but yields of ortho-phthalic acid were low, i. e., in the neighborhood of 70% based on conversion, irrespective of the mole ratio of water to xylene, presumably because the ortho-phthalic acid undergoes appreciable decarboxylation. Spot checks on the eutectic mixture of meta-xylene and para-xylene indicated that the employment of mole ratios of water to xylene above about 25:1 greatly increased the rate of reaction and improved conversions, yields and product quality.

While mole ratios of water to xylene above about 25:1 in the reaction mixture improve results in respect to reaction time and yield under any operative conditions, best results are obtained when this high mole ratio of water to xylene is used in combination with high temperature and high pressure.

If optimum conversions and yields are to be obtained during short reaction periods, the temperature must be above about 580 and below the critical temperature of water, preferably in the range from about 600 to 675° F.

A series of runs were made in which meta-xylene, sulfur, ammonia and water were charged to a bomb at mole ratios of 1:6:2.5:60. Runs were made at different temperatures, each run being continued until the reaction was complete. In each case the bomb was cooled, depressured, and the reaction product was worked up as phthalic acid. Results of these runs are set out in the following table:

| Temp. (° F.) | Run No. | Reaction Time (min.) | Yield (Mole Percent) |
|---|---|---|---|
| 550 | 749-19 | 150 | 83.3 |
| 580 | 749-24 | 80 | 90.3 |
| 600 | 749-27 | 45 | 90.0 |
| 630 | 749-47 | 30 | 92.5 |
| 650 | 749-18 | (<30) | 92.3 |

Further, if the full advantage of the employment of high mole ratios of water to xylene in the reaction mixture is to be realized, high pressures above 1700 p. s. i. and at least 400 p. s. i. above the pressure of water vapor in equilibrium with liquid water at reaction temperature must be employed in the initial stages of the reaction. As the reaction proceeds, the pressure in the closed reaction zone rises due to the formation of hydrogen sulfide as the reaction proceeds. The pressure is controlled to lie within this range by adjusting the volume of the reactants charged to the volume of the reactor space. For example, when water and xylene are charged to the reaction zone at mole ratios of 25:1 to 100:1, and sulfur and ammonia are charged in approximately stoichiometric quantities, i. e., 6 moles of sulfur per mole of xylene and 2 moles of ammonia per mole of xylene, the reaction mixture should be charged to the reaction zone in an amount such that at least .25 mole of xylene are charged per liter of reaction space.

In addition to the shortened reaction time and higher yield of phthalic acids obtained by carrying out the oxidation with a high mole ratio of water to xylene pursuant to the invention, other significant advantages are obtained. Xylene feeds which could be economically prepared for conversion to phthalic acids in a commercial scale operation will contain very substantial proportions of ethyl benzene and may have an appreciable content of nonaromatic hydrocarbons if they are derived from a petroleum source, as from catalytically reformed naphtha. During the reaction the presence of either ethyl benzene and/or nonaromatic hydrocarbons gives rise to the formation of dark tarry materials which tend to discolor the final phthalic acid product. If high mole ratios of water to xylene in the range from about 25:1 to 100:1 are employed in the oxidation reaction, the formation of these materials appears to be suppressed and the color of the phthalic acid product is good. A second collateral advantage of the employment of high mole ratios of water to xylene in the reaction is observed in the ultimate utilization of the phthalic acids in the preparation of alkyd resins. The colors of resins produced from phthalic acids prepared by oxidizing xylene with the Willgerodt reagent using as low as 25:1 mole ratio of water to xylene average 5-6 on the Gardner scale and are borderline quality in general alkyd resin usage. When a resin is prepared by a parallel procedure, except that the mole ratios of water to xylene are 33:1 and 60:1, the resins show Gardner color values of 3-4 and 3, respectively, and are entirely satisfactory in general alkyd resin usage. These differences are observed on products which were put through identical purification procedures.

When high mole ratios of water to xylene are employed pursuant to the invention, the other reactants are present in approximately stoichiometric quantities. Small excesses of either sulfur or ammonia over the amount stoichiometrically required for the reaction may be employed if desired, i. e., 7-9 gram atoms of sulfur per mole of xylene and 2.5-3 moles of ammonia per mole of xylene.

It will be appreciated that aqueous ammonium polysulfide may be charged to the reactor instead of sulfur, water and ammonia, both being well recognized as equivalent Willgerodt reagents. The beneficial effects of the high mole ratios of water to xylene, above described, are realized whether water, sulfur and ammonia are separately charged or whether they are first brought together to form ammonium polysulfide which is charged as such.

I claim:

1. In a process for oxidizing xylenes by heating the xylene with water, sulfur and ammonia in an oxidation zone at an elevated temperature and pressure, the improved method which comprises charging from about 25 to about 100 moles of water per mole of xylene to the reaction zone.

2. In a process for oxidizing xylenes by heating the xylene with water, sulfur and ammonia in an oxidation zone, the improved method which comprises charging from about 25 to about 100 moles of water per mole of xylene to the reaction zone, maintaining in the reaction zone a temperature in the range from 580° F. to the critical temperature of water and a superatmospheric pressure in excess of 1700 p. s. i. and at least 400 p. s. i. higher than the pressure of water vapor in equilibrium with liquid water at the reaction temperature.

3. The method as defined in claim 2, wherein the temperature is in the range 600-675° F. and the pressure is in the range 2500-6000 p. s. i. g.

References Cited in the file of this patent

UNITED STATES PATENTS

| 2,587,666 | Toland | Mar. 4, 1952 |
| 2,610,980 | Naylor | Sept. 16, 1952 |
| 2,695,312 | Toland | Nov. 23, 1954 |